(12) United States Patent
Luijten et al.

(10) Patent No.: US 6,999,415 B2
(45) Date of Patent: Feb. 14, 2006

(54) SWITCHING DEVICE AND METHOD FOR CONTROLLING THE ROUTING OF DATA PACKETS

(75) Inventors: Ronald R. Luijten, Horgen (CH); Michel Colmant, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 09/800,246

(22) Filed: Mar. 5, 2001

(65) Prior Publication Data

US 2001/0021174 A1 Sep. 13, 2001

(30) Foreign Application Priority Data

Mar. 6, 2000 (EP) ................................. 00810186

(51) Int. Cl.
*G01R 31/08* (2006.01)
(52) U.S. Cl. .................................... 370/230; 370/235
(58) Field of Classification Search ............... 370/229, 370/230, 203.1, 232, 235, 236, 389, 468
See application file for complete search history.

(56) References Cited

U.S. PATENT DOCUMENTS

| 5,668,797 | A | * | 9/1997 | Fahmi et al. | ................ | 370/229 |
|---|---|---|---|---|---|---|
| 5,831,971 | A | * | 11/1998 | Bonomi et al. | ............. | 370/230 |
| 6,108,303 | A | * | 8/2000 | Fahmi et al. | ................ | 370/230 |
| 6,570,873 | B1 | * | 5/2003 | Isoyama et al. | ............ | 370/375 |
| 6,608,813 | B1 | * | 8/2003 | Chiussi et al. | ............... | 370/218 |
| 6,721,273 | B1 | * | 4/2004 | Lyon | .......................... | 370/235 |
| 6,781,986 | B1 | * | 8/2004 | Sabaa et al. | ................ | 370/389 |

* cited by examiner

*Primary Examiner*—Bob A. Phunkulh
(74) *Attorney, Agent, or Firm*—Douglas W. Cameron; Anne Vachon Dougherty

(57) ABSTRACT

A switching device comprising several input ports and several output ports, whereby each of the input ports is connectable to a corresponding switch adapter. At least one switch controller controls the routing of incoming data packets from the input ports to the output ports. For each output port a congestion controller is arranged which in operation, generates grant information which signals whether the switch adapters are allowed to send the data packet to the output port. For each of the input ports a data packet access controller marks a data packet as non-compliant if the packet was erroneously sent from said output port.

11 Claims, 3 Drawing Sheets

SWITCHING DEVICE AND METHOD FOR CONTROLLING THE ROUTING OF DATA PACKETS

FIELD OF THE INVENTION

The invention relates to a switching device for data packets, with several input ports and several output ports wherein incoming data packets are transported according to their header to one or more designated output ports and from there to a subsequent device. The input ports of the switching device are connectable to switch adapters. More particularly the invention relates to a switching device which routes data packets (including ATM cells and Ethernet frames) through a switch fabric, with a mechanism to prevent data packets from being processed when the switch adapters have been notified of congestion.

BACKGROUND OF THE INVENTION

Fast switching of information, be it samples of analog signals or alphanumeric data, is an important task in a communication network. The network nodes, in which lines or transmission links from various directions are interconnected for exchanging information between them, are often the cause of delay in the transmission. If much traffic is concentrated in a node, and particularly if most of the traffic passes through only few of the links, increased delays or even loss of information can often be encountered. It is therefore desirable to have switching nodes which allow fast routing.

In European patent application 312628 a switching apparatus is described for interconnecting a plurality of incoming and outgoing transmission links of a communication network, or for exchanging data between incoming and outgoing computer and workstation connection links. Furthermore, known packet formats are described.

An overview of prior art switching technology is given on the Internet page www.zurich.ibm.com/Technology/ATM/SWOCPWP, wherein an introduction into the PRIZMA Chip is illustrated. Another source for information about this topic is the publication "A flexible shared-buffer switch for ATM at Gbit/s rates" by W. E. Denzel, A. P. J. Engbersen, and I. Iliadis, which is published in "Computer Networks and ISDN Systems," (0169-7552/94), Elsevier Science B.V., Vol. 27, No. 4, pp. 611–624.

The PRIZMA chip comprises a shared common output buffer and has 16 input ports and 16 output ports which provide a port speed of 300–400 Mbit/s. The switch's principle is first to route incoming packets through a fully parallel I/O routing tree and then to queue the routed packets in the output buffer. In addition to this, the chip uses a separation between data (payload) and control (header) flow. Only the payloads are stored in a dynamically shared output buffering storage. The PRIZMA chip has a scaleable architecture and hence offers multiple expansion capabilities with which the port speed, the number of ports and the data throughput can be increased. These expansions can be realized based on a modular use of the PRIZMA. Also single-stage or multi-stage switch fabrics can be constructed in a modular way.

The PRIZMA chip is especially suited for broadband telecommunications, based on ATM, i.e. the Asynchronous Transfer Mode. However, the concept is not restricted to ATM-oriented architectural environments. ATM is based on short, fixed-length packets, often called cells, and is supposed to be applied as the integrated switching and transmission standard for the future public Broadband Integrated Services Digital Network (BISDN). PRIZMA's topology and queuing arrangement for contention resolution with a high degree of parallelism. The routing function is performed in a distributed way at the hardware level, referred to as self-routing. ATM packets are classified into several packet types, particularly packet types with different payload sizes, and the PRIZMA chip is dedicated to handling packets with a payload up to 64 bytes. However, also packet payloads with 12, 16, 32 or 48 bytes are often to be transported.

In the case of multiple data sources being connected to a single switching device, each of the sources is assigned a specific bandwidth which may not be or may only negligibly be exceeded, otherwise the performance of the switching device would decrease, thereby introducing bigger latency or even data loss. Data sources, respectively the companies that provide the data, are subjected to a bandwidth usage policy which typically leads to penalty fees, if a company exceeds its assigned bandwidth level. It is the task of the switching device to treat the data sources fairly in processing the data packets from those data sources that stay below the assigned bandwidth and to, if necessary, only decrease processing quality to those data packets that arrive in excess to the assigned bandwidth. This so-called "quality of service" is crucial in order to satisfy the interests of customers who have obtained the right to be treated fair concerning their data packets. Unfair treatment can lead to customer dissatisfaction and financial losses. For regulating the incoming flow of data packets to a switching device, in U.S. Pat. No. 5,493,566 a system is described for controlling the flow of data cells through a packet switch which combines both input and output buffers in a feedback loop. The fullness level of the output buffers is continuously monitored and reported to an access device on the input side of the switch. The access device includes input buffers and a throttling device to stop the flow of data cells, and to hold them in the input buffers, when the fullness level of the output buffers exceeds a predetermined level. A status message of output buffer fullness is compared to an access message indicating which output buffers are addressed by cells in the input buffers and only those cells addressed to overfull output buffers are stopped by the throttling device.

The throttling device according to the latter-mentioned prior art is the part of the switch adapter regulating the speed of the data packets being sent to the switching device. At the switching device itself there is no mechanism to cope with an adapter which is not throttling the data packet stream according to the reported output buffer status, due to whatever reason.

It is, therefore, an object of the invention to provide a switching device and method which is able to cope with switch adapters, that continue to send data packets despite backpressure, in order to be able to offer fair treatment and quality of service to all connected data sources.

SUMMARY OF THE INVENTION

The invention is directed to a switching device comprising several input ports and several output ports, whereby each of the input ports is connectable to a corresponding switch adapter. At least one switch controller controls the routing of incoming data packets from the input ports to the output ports. For each output port a congestion controller is arranged which, in operation, generates grant information to signal whether the switch adapters are allowed to send a data packet to the output port. For each of the input ports a data packet access controller is provided, in case a packet is sent, which marks a data packet is received at the input port as non-compliant. This non-compliance mark is usable for preventing the data packet from being routed. The compliance mark detection is performed by a data packet access controller which belongs to the switching device. Advantageously, the flow control latency, (i.e., the difference between the time the non-allowance is received at the data packet access controller and the time the first data packet that may have been sent after the switch adapter has been informed about the non-allowance), is taken into account in the data packet access controller.

In an input-buffered common output-buffering scheme the invention can be implemented as follows: for the output queues and/or for the common output buffer a grant means, in the form of a congestion controller, is provided for signaling to the input buffers that a threshold value of occupied places in one or more of the output queues of occupied addresses in the common output buffer has been exceeded. The obedience of the input buffers to this backpressure is guaranteed by the data packet access controller which marks the data packets that arrive, despite issuance of the backpressure, in the form of negative grant information as "non-compliant". For a multicast data packet the order information thereof is enterable in each of the output queues for the output ports, which this multicast data packet is intended to reach, and the address thereof is only releasable by the address manager for another data packet when all order information of the multicast data packet has been successfully processed by the output router.

The data packet destination information is derivable from the content of the data packets. For data packets with different handling-priorities, for each class of priority and for each output port, a separate input queue may be provided.

It is advantageous to sort the data packets at each input port according to the output ports which the data packets have as their destinations, to place them into input queues of an input buffer which comprises at least as many of the input queues as the switching device has output ports, and to multiplex the data packets from the input queues of their corresponding input buffer to the router. In the output-buffered router arrangement, it is possible to use an independent controller for each input port with the order of the data packets being multiplexed, and to route the data packets according to data packet destination information, to at least one dedicated output port via the router and to at least one output buffer.

BRIEF DESCRIPTION OF THE DRAWINGS

The invention will now be described in greater detail with specific reference to the appended drawings wherein.

DETAILED DESCRIPTION OF THE INVENTION

Figure 1:
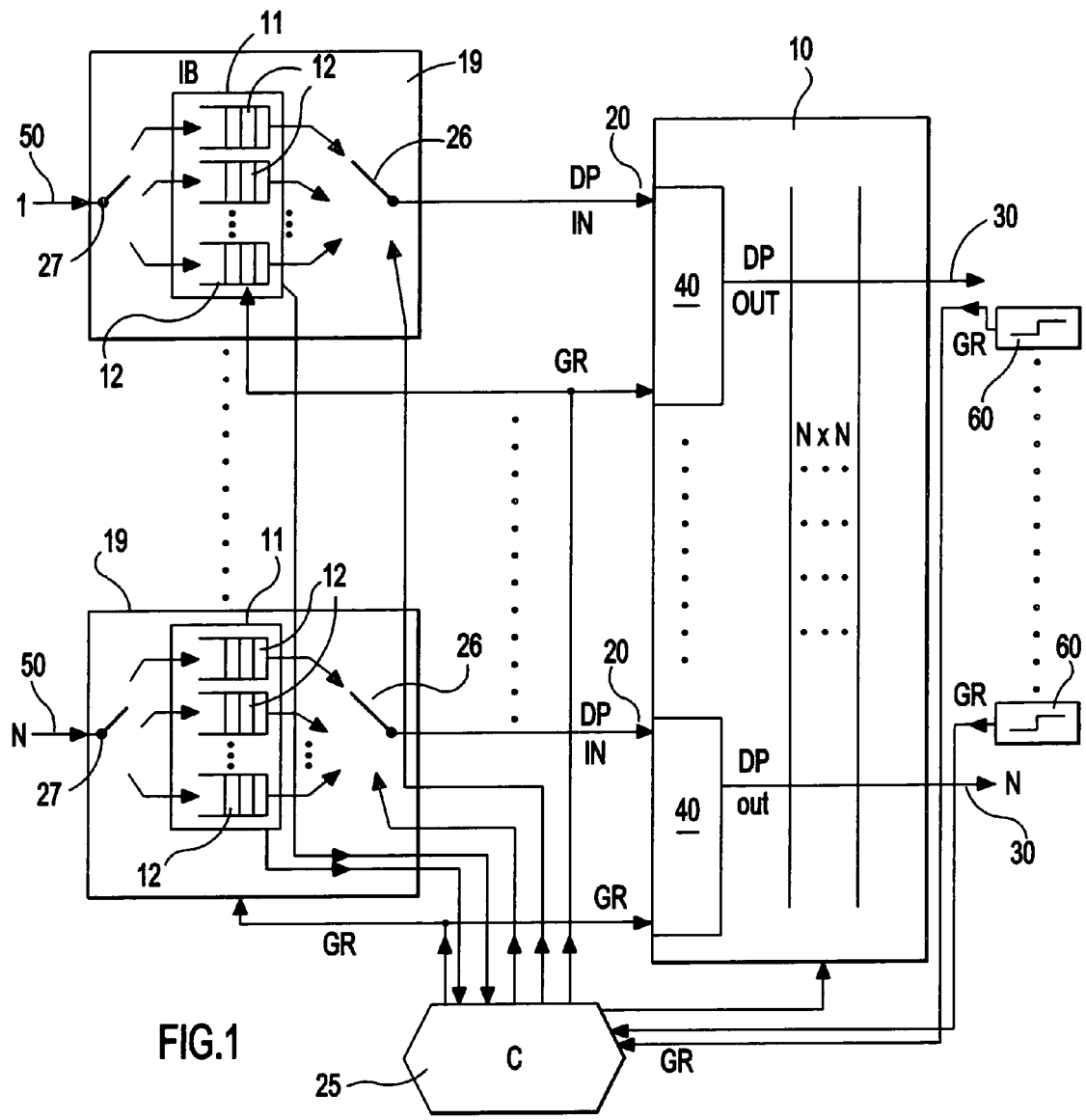
FIG. 1 a crossbar switch arrangement with virtual output-queuing.

In the following, the various exemplary embodiments of the invention are described. In FIG. 1, an input-buffered switching device 10 for handling data packets is shown. Data packets arriving at the switching device 10 contain data to be transported, also referred to as payload, and a data packet header, which contains various information about the data packet, (e.g., the packet type, an integrity checksum and the destination address for this data packet) also referred to as data packet destination information.

The arrangement comprises a switching device 10, such as a crossbar switching device, with a number N of input ports 20 and a number N of output ports 30. At each input port 20 a switch adapter 19 comprising an input buffer 11, realized in form of a FIFO queue (designated also with "IB") is arranged. Each switch adapter 19 is connected to a corresponding adapter input line 50. The input buffers 11 are each split up into a multitude of input queues 12, each input buffer 11 having exactly one input queue 12 for each output port 30. Therefore, each input buffer 11 comprises N input queues 12 in the illustrated example. Each of these input queues 12 in one input buffer 11 serves for storing therein the arriving data packets heading for one and the same particular output port 30. Accordingly, the arriving data packets are sorted in each input buffer 11 according to their destination output port 30. Therefore, the switch adapter 19 comprises a distributor 27 which serves for distributing the data packets, arriving at the adapter input lines 50, to the input queues 12 according to their destination. At the output of the input queues 12 a selector 26 serves for connecting at a certain point in time that respective input queue 12 which is allowed to transfer a data packet to the switching device 10 at that point in time.

All switch adapters 19 are connected to a common control unit 25, designated also with "C", which is itself connected to the switching device 10. The purpose of the control unit 25 is to lead the data packets, which arrive via the adapter input lines 50 and which are supposed to arrive at one or more of the output ports 30, to these output ports 30. From the output ports 30, the data packets can be delivered to subsequent devices, be it further switching devices or receiving devices, etc.

This arrangement provides for a so-called first-buffer-then-switch function, such that when an arriving data packet can not be immediately conducted to the output port 30 it is heading for, because this output port 30 is already busy with receiving another data packet, this arriving data packet is held back in the respective input buffer 11, until the path this data packet needs to take through the switching device 10 is free. The control unit 25 provides for the necessary connections between the input ports 20 and the output ports 30 according to the data packet destination information that is contained in each data packet header, and signals to the input buffers 11 when the path for the next data packet in the respective input buffer 11 is free, such that this data packet can be taken from the input buffer 11 and sent to its destination, (i.e. the targeted output port 30).

If the data packet heading for a certain output port 30 is blocked because this output port 30 is at that moment busy with another data packet (wherein in this arrangement the only data packets that can be blocked by a head-of-the-line-blocking data packet are data packets heading for the same output port 30), data packets heading for another output port 30 can be handled independently and be forwarded to the switching device 10 when the path towards their destination output port 30 is unoccupied. In the theoretical case, this leads to an ideal performance curve with a theoretical maximum throughput of 100%. A realistic approach to using the described arrangement results in the practical recommendation to load this switching device 10 with not more than 40%–50% of the maximum possible data packet traffic, because beyond that range the delay-versus-load curve is becoming steeper, which means that a small increase in load results in a large increase in delay with input buffer space being used. The strong dependence of the delay on the load is not desired for real applications, which implies a preferred use of the switching device 10 in the flat portion of the delay-versus-load curve. The significance of this is the following: a crossbar switching device 10 with 16 input/output ports and a port speed of 1 Gigabits per second (Gbps), can with that restriction not handle an aggregate traffic of 16*1 Gbps, but only 40%–50% thereof, i.e. 6.5–8 Gigabits per second.

Furthermore, with finite input buffer 11 space, data loss probability will increase due to filling or blocking the input buffer space and, once the input buffer 11 is full, the arriving data packets will get lost. This probability increases also with multicast packets.

In order to avoid loss of data in case of congestion through blocked data packets, a flow-control mechanism for the data packets is added, called grant-mechanism, performed by a not-depicted congestion controller, which creates grant information GR outgoing from any output port 30 to the control unit 25 which distributes this grant information GR to all input buffers 11. The grant information GR can have two states, either granting, (i.e. the input buffers 11 are allowed to send data packets) or nongranting, (i.e. the input buffers 11 may no longer send data packets). The granting state is referred to as positive grant information GR and the non-granting state as negative grant information GR. The negative grant information GR signals to the input buffers 11 that the output port 30, which issued the negative grant information GR, is no longer able to receive arriving data packets; and, hence, the input buffers 11 shall stop sending further data packets to the respective output port 30 until a newly issued positive grant information GR tells the input buffers 11 that sending of the data packets can be resumed. The grant information GR is here issued by a congestion controller 60, one for each output port 30. As soon as a status that is interpreted by the congestion controller 60 as overflow or congestion, is reached, the congestion controller 60 toggles from the positive grant information GR to the negative grant information GR. As soon as the congestion controller 60 detects that the congestion or overflow has disappeared, it toggles back from the negative grant information GR to the positive grant information GR. Depending on the implementation and a safeguard margin, the threshold for toggling will lie typically below the maximum filling degree. For toggling forth and toggling back two different thresholds may be used providing for a toggling hysteresis.

The switching device 10 comprises, for each input port 20, a data packet access controller 40 which receives the grant information GR for the respective input port 20. The task of the data packet access controller 40 is to ensure that data packets arriving from an input buffer 11, which have been sent despite negative grant information GR, are recognized. They can then be denied processing by the switching device 10. Those data packets are hence classified as non-compliant and marked accordingly.

This case can occur, for example, when the switch adapter 19 is defective and does therefore not react to the negative grant information GR. When the marked data packets are discarded, the control mechanism by the data packet access controller 40 does ensure that despite such misbehavior the data packet traffic policy is applied and only compliant data packets are processed (i.e. transferred to their destination output port 30}. Otherwise, the switch 10 would process data packets that are non-compliant with the data packet traffic policy which would be detrimental to the bandwidth available for those switch adapters 19 which act compliant with the data packet traffic policy. In order to guarantee quality of service for all switch adapters 19 to the users sending the data packets via the switch adapters 19, the data packet traffic policy must be obeyed.

At this stage, the data packet access controller 40 functions as a data packet classifier in that it recognizes non-compliant data packets. The recognition can then be used for different purposes as set forth hereinafter. The fact that non-compliant data packets have arrived may be communicated to the corresponding switch adapter 19 or a different device which thereby is informed that something is not working as it should. The data packet access controller 40 hence acts as a diagnosis system and the detected malfunction of a switch adapter 19 can be remedied by replacing or repairing that switch adapter 19. In a business environment where bandwidth is paid for, the owner of the defective switch adapter can also be charged for the resulting overuse of bandwidth. The most useful treatment of the marked data packets is to discard them in order to avoid additional throughput latency and to avoid not processing compliant data packets. The use of the marking is determined by the programming design of the respective switching device 10. The switching device may hence be designed such that non-compliant data packets are automatically discarded. Additionally the communication to the defective switch adapter 19, or a device arranged further upstream of the switch adapter 19, may be performed. For deciding on the processing or discarding of a data packet, the switching device comprises a non-depicted flow control unit which performs the flow control.

Since the part of the header of a data packet determining the destination of the data packet is no longer necessary after arrival of the packet at the output port 30, the space of this part can be used for placement of the grant information GR. The space sufficiently large that, not only the grant information GR for one single output port 30, but the grant information GR for all output ports 30 fits in the header of one single data packet. For instance, for each input port 20, one single bit can represent the status of the corresponding grant information GR. The data packet header thereby contains a bit map showing the grant status for all input ports 20. It is also conceivable that, in addition to the grant/non-grant state of the grant information, the GR information about the circumstances of the grant information GR can be generated and transferred. For instance, the grant information GR can depend on different thresholds which may be implemented. The information generated and put into the header can then also contain, in binary-coded form, the threshold which has been exceeded by the number of queued data packets, as will be explained further below.

The modified data packet is then sent out from the output port 30 to a subsequent device and, since it is advantageously common practice to unify the output ports 30 and the input ports 20, the modified data packet, now containing the grant information GR in its header, automatically arrives at the input port 20, which can the read the grant information GR from the header and can get an update of the grant information. This update can be done with each data packet, such that the switch adapters 19 are continuously informed about a change in the grant information GR.

Figure 2:
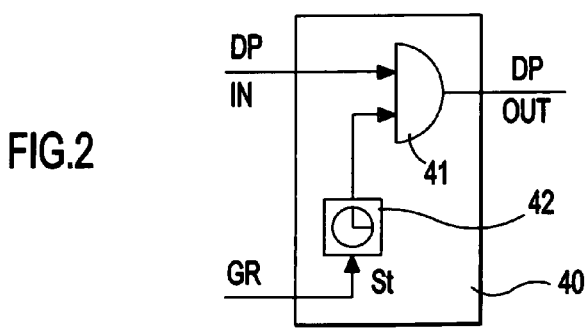
FIG. 2 an embodiment of a data packet access controller.

In FIG. 2 an embodiment of a data packet access controller 40 is depicted. The data packet access controller 40 comprises an access gate 41 and a finite state machine, in the form of a counter 42 whose output is connected to an input of the access gate 41 whose other input is fed with the incoming data packets (DP in) from the switch adapter 19. The counter 42 provides for a time frame during which, after a negative grant information GR has been generated and sent, data packets are nevertheless accepted as compliant. This time frame is provided for because of the time difference between the point in time the grant information GR is sent and the point in time it has arrived at the input buffer 11 plus the time a data packet sent right before the latter point in time needs to arrive at the switching device 10, the time difference defining a flow control latency. This point in time is variable, and choosing the latest possible point in time, (i.e. using the maximum traveling time for a data packet from the input buffer 11 to the data packet access controller 40), is perceived to be the optimum solution since, although the one or the other non-compliant data packet will then be accepted and processed despite its non-compliance, nevertheless, no single compliant data packet will be treated as non-compliant and be used for retaliatory action in the form of discarding or fault signaling. The counter 42 can hence be set to this upper bound of the flow control latency and will be started each time a grant information GR is received at the data packet access controller 40 and will be reset as soon as the grant information GR toggles from negative to positive.

The time difference between the point in time when the grant information GR is being sent and the point in time when the last data packet, that has been sent from an input buffer 11 before the grant information GR arrived at that input buffer 11, arrives at the output port 30 that sent the grant information GR, is called round-trip delay.

The grant information GR is here provided in form of a single bit representing the grant information GR for one output port 30, respectively input port 20. The negative grant information GR is created when the amount of data packets buffered in or after one output port 30 exceeds a predetermined first threshold. This first threshold is set lower than the actual size of the buffer of the output port 30 in order to be able to buffer there those data packets that may be sent from the input adapters (i.e., switch adapters 19) during the time during which the negative grant information GR needs to effect the non-grant in the input buffers 11. The switching from the negative to the positive grant information GR may be triggered by the underflow of a second threshold, which may be but need not be identical to the first threshold. As explained above, even several such thresholds can be implemented, for overflow and/or for overflow plus the information about which threshold in particular has been the reason for toggling the grant information GR, and can be communicated to the switch adapters 19.

The sorting per destination is also referred to as Virtual Output Queuing (hereinafter "VOQ"). The control unit 25 has to handle a maximum of $N^2$ requests, which leads to a significant increase of complexity with rising number of input/output ports 30. Per se this does not impose a severe problem; however, it is generally desired to realize at any point in time and under any circumstances a fair treatment for each input queue 12, and to achieve also optimal exploitation of the switching-device capacity, which is that at any point in time each output port 30 has a data packet to deliver. This ambitious goal is a non-trivial task for the control unit 25, that renders the control unit 25 very complex.

The complexity of this arrangement increases further, when it is designed to cope with data packets of different priority, (i.e. in that for each priority a different input queue 12 is provided). Then, the number of input queues 12 per input buffer 11 is the number of output ports 30 multiplied by the number of priorities.

Figure 3:
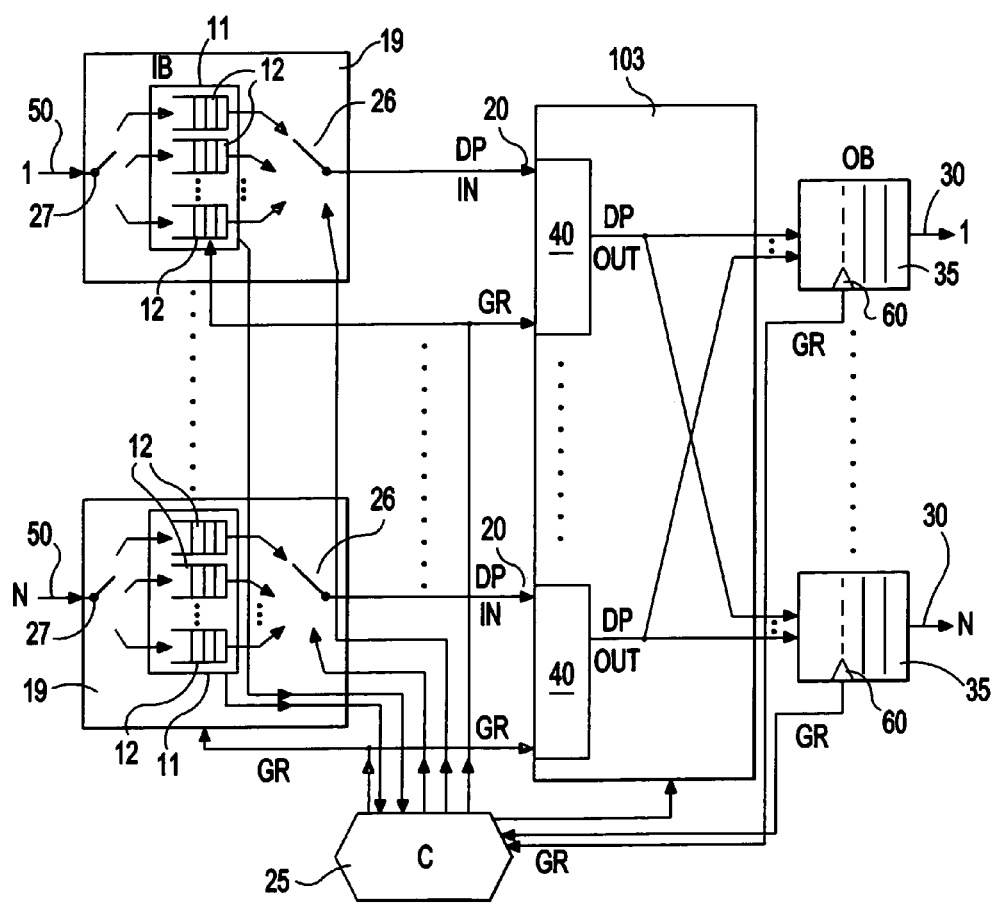
FIG. 3 a router-based switch arrangement with single output buffers.

In the following examples it is supposed that the switching device 10 is designed to automatically discard non-compliant data packets. Another approach is to first queue and then buffer. In theory this model arrives at a pure output-buffering system. However, in reality, buffer size is limited and not infinite. Since, with finite output buffers, a probability exists that data packets arriving at the output buffer find it already filled up and hence get lost, the finite output buffer is combined with an infinite input buffer, of course practically also realized with a finite input buffer. This arrangement is depicted in FIG. 3 and differs from the arrangement in FIG. 1 in that the switching device 10 is not a crossbar switching device but a routing switching device 103, in short referred to as router 103. Between the router 103 and each of the output ports 30, an output buffer 35, designated also with "OB", is arranged. The data packets arriving at the router 103 are routed to their destination output ports 30 where they are buffered in the corresponding output buffer 35.

Also, here the grant mechanism is employed for handling a possible output buffer overflow. Each output buffer 35 has its defined first threshold above which the grant information GR is switched from positive to negative, and vice versa with the second threshold. The grant information GR is fed to all input buffers 11 via the control unit 25. The negative grant information GR requires that all input buffers 11 stop sending data packets to that output port 30 whose output buffer 35 triggered or issued the negative grant information GR.

The task of the data packet access controller 40 is again to deny data packets which arrive from an input buffer 11 despite the negative grant information GR. Those data packets are classified as non-compliant and are optionally discarded. As described above, the data packet access controller 40 serves for guaranteeing obeisance to the grant information GR.

Since the input buffers 11 can more easily be physically separated from the switching device due to the smaller number of connection lines between the input buffers 11 and the switching device, router 103, the input buffers 11 can be realized with cheaper memory chips, and hence their buffer size can in reality be chosen much larger than could be for the output buffers 35 at the same price. Hence with this scheme, the finite input buffers 11 represent a better approximation to the theoretical infinite input buffers 11. The above described arrangement has however two disadvantages. On one hand, the router 103 has to provide a functionality that has a complexity rising with $N^2$, due to the $N^2$ output lines to the output buffers 35. On the other hand, the switching device is not used optimally. Assuming no multicast traffic, for each input port 20 there is only one data packet to send to one output port 30 at any moment in time. Hence for each input port 20, N-1 output lines of the router 103 are not used at any moment in time (i.e. ,of the $N^2$ output lines only N lines are used). Furthermore, the output buffer 35 itself is not used optimally. In the case that more than one input port 20 is sending a data packet to the same output port 30, at that moment at least one other output port 30 does not receive a data packet, and consequently has a lower need for output buffer space. With a separate output buffer 35 for each output port 30, there is no possibility that temporarily more buffer space is available for very busy output ports 30 at the expense of non-busy output ports 30.

Figure 4:
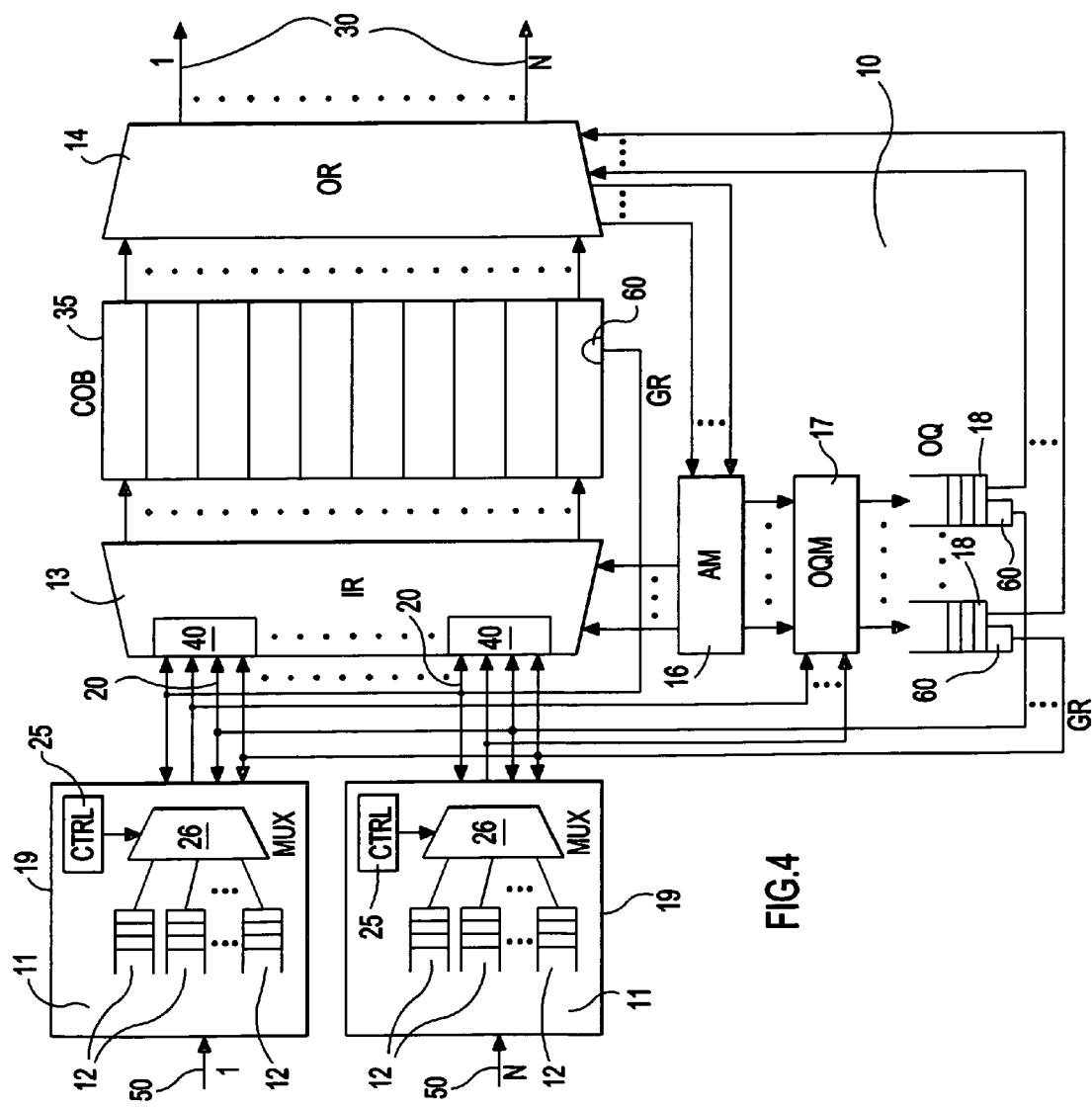
FIG. 4 a router-based switch arrangement with shared output buffer.

In the arrangement shown in FIG. 4, the output buffer space can be shared dynamically between all output ports 30, which at the same time also solves the above mentioned problem of the complexity rising with $N^2$. The arrangement depicted in FIG. 4 comprises the N input buffers 11 and the router split up into an input router 13 and an output router 14. At the output side of the input router 13 only one common output buffer 35, designated also with "COB", is arranged, which serves for all data packets coming from the input router 13, designated also with "IR". At the output side of the common output buffer 35 the output router 14, designated also with "OR", is arranged. In parallel to the input router 13 and the output buffer 35, an address-manager 16, designated also with "AM", is arranged, connected to the input router 13 and to the output router 14. The address-manager 16 is connected to an output-queue-manager 17, designated also with "OQM", which receives input from all input buffers 11 and from the address-manager 16. It comprises for each output port 30 an output queue 18, designated also with "OQ", which provides input to the output router 14.

The arrangement comprises for each input port 20 the input buffer 11 with virtual output queuing, (i.e. with input queues 12 in each input buffer 11 for each output queue 18). The input buffers 11 are connected to the input router 13 which is followed by the common output buffer 35 and the output router 14. Each input buffer 11 has its own input controller 25 for controlling the order of outgoing data packets from the different input queues 12 of that input buffer 11.

All arriving data packets are routed via the input router 13 to the common output buffer 35. The address-manager 16 provides the input router 13 with the information at which place in the common output buffer 35 (i.e., at which address therein) the arriving data packets are to be stored. Alternatively, the architecture can be designed, that the input buffers 11 get that information and provide the input router 13 therewith.

The information, at which address in the output buffer 35 each data packet that is heading for a specific output port 30 is stored, is written into the output-queue-manager 17, more precisely, into the output queues 18 thereof This information is referred to as order information. For each data packet that is stored in the common output buffer 35 such order information is put at one place in that output queue 18, to which this data packet shall be sent. The addresses are thereby sorted according to the corresponding output ports 30 (i.e., those output ports 30 for which the packets stored at the respective addresses are heading). This means that each output port 30 retrieves the addresses of the data packets, which shall arrive at that output port 30, from the respective output queue 18. The address-manager 16 simultaneously handles one address at each point in time for each output queue 18. This means also that for each input port 20 one address is always held available, and this can be done already before the respective data packets arrive. Each data packet arriving head-of-the-line at an input port 20, hence finds an address where to be lead by the input router 13. These N addresses are provided by the address-manager 16 also to the output-queue-manager 17 which receives as input further N pieces of data packet destination information which provide the "mask" designating in which output queue 18 to enter the order information for all arrived data packets. The parallel handling of the addresses for all input ports 20 increases the speed and fairness of data packet processing. The case of non-availability of addresses is discussed further below.

Every incoming data packet is hence given an address by the address-manager 16, at which address this data packet is then stored in the common output buffer 35, whereby the address is stored at a place in the output queue 18 corresponding to the output port 30 to which the packet is heading. The information therefor (i.e., the data packet destination information) is derived from the packet header. The output router 14 serves for the final distribution, in that, for each output port 30, it retrieves from the corresponding output queue 18 the next address, and then fetches the data packet at that address and feeds it to the destination output port 30. The fetching step is here a nondestructive reading process, which allows for multicast data packets to be handled such that they are only once stored in the common output buffer 35 but are read several times, until every output port 30 which has to receive this data packet, has received it. After the reading of the data packet out of the output buffer 35, the respective address is released in that this address is fed back to the address-manager 16, which can again assign this address to one of the input ports 20 for handling the next arriving data packet. For multicast data packets a counter, not depicted in the drawing, is used. The counter is, upon storing the data packet, set to the number of output ports 30 to which the data packet is to be transmitted, and is decreased each time the data packet is fetched by the output router 14. When the counter reaches the reading 0 for this data packet, the corresponding address can be released. The common output buffer 35 hence brings in the advantage that instead of $N^2$ connections between the output buffer 35 and the input router 13, only N connections are needed (i.e., the required resources have been reduced at the interface between the input router 13 and the output buffer 35 from $N^2$ to N).

The principle of sharing the output buffer 35 is introduced in that the output queues 18 in total have more queuing places than the output buffer 35 has addresses. By this measure, the input ports 20 have the impression that for each output port 30 there is more place in the output buffer 35 than only the output buffer 35 divided equally by the number of output ports 30. As long as the total traffic of the data packets does not exceed the real maximum capacity of the output buffer 35, the performance will increase, since the arrangement is much more flexible concerning extreme traffic pattern change. Particularly bursty traffic can be handled better, since the probability of data packet loss is reduced by allowing an output port 30 to use more output buffer space than its fair share thereof would offer.

The sharing principle however introduces the possibility of hogging, which means that one very busy output port 30 can monopolize the complete shared memory of the output buffer 35, thereby depriving other output ports 30, if no other mechanisms for preventing this effect are introduced. Furthermore, it has to be taken into account, that sharing only creates a virtual output buffer space which is larger than the real output buffer space. This means, that the input ports 20 might try to occupy the virtual output buffer space to an extent that exceeds the real output buffer space.

Also here the grant mechanism is employed for handling the probability of output buffer overflow, respectively output queue overflow. Each output queue 18 has the defined first threshold above which the negative grant information GR is generated and a second threshold below which the positive grant information GR is generated, which is fed to all input buffers 11. The negative grant information GR requires that all input buffers 11 stop sending data packets to that output port 30 whose output queue 18 issued the negative grant information GR. Furthermore, in the case of sharing, also the output buffer 35 needs to be supervised for an eventual overflow. Since, in the case of sharing, the sum of the number of places of all output queues 18 is bigger than the number of addresses in the output buffer 35, the output buffer 35 can be filled up although no output queue 18 is reaching its threshold value for the therein stored data packets. Hence, the output buffer 35 has a third threshold value for occupied addresses, which when reached causes the creation of a memory-full-backpressure in the form of the negative grant information GR, to all input buffers 11 which then all have to stop sending their data packets to the output buffer 35 via the input router 13, (i.e. not a single packet may be sent from all input buffers 11). As soon as the number of occupied addresses falls below the third threshold value, or a different fourth threshold value, normal operation can be resumed.

Hence, a feedback mechanism is here arranged which serves for signaling to the input buffers 11 if a specific output queue 18 is full (i.e., a certain threshold value for that output queue 18 has been exceeded), and hence if further data packets are allowed to be sent to that output queue 18. Upon a non-grant condition at a certain output queue 18 (i.e., the corresponding threshold has been exceeded), the negative grant information GR is issued and each input controller 25 can react in that the data packets heading for the output port 30 belonging to that output queue 18 are no longer sent from the input buffers 11 (i.e., the data packets from the input queues 12 for the occupied output queue 18 are held back) while the other input queues 12 can continue sending their data packets.

For multicast data packets in this embodiment the generation of grant information can be varied, in that for them no grant information is generated at the output queues 18, or that grant information is neglected. Since, for multicast data packets in each output queue 18 where the multicast data packet is heading, an entry is made, the probability rises with the number of output queues 18, that the multicast data packet is marked as non-compliant when only a single of those output queues 18 has an overflow triggering the negative grant information. This might lead to an extreme and unfair backpressure to multicast data packets. Using only the grant information from the common output buffer 35 resolves that problem. As a countermeasure for this preferential handling of multicast data packets, a separate counter or buffer for the multicast data packets can be arranged which, when reaching a predetermined number or threshold, generates a negative grant information thereby limiting the number of processed multicast data packets.

In contrast to the virtual output queuing model realized in FIGS. 1 and 3, here no central controller is used. Instead, each input buffer 11 has its own input controller 25 which works independently from the other input controllers 25. This comes from the fact that this arrangement comprises the input router 13 which allows for all input buffers 11 to send their data packets independently via the input router 13, whenever the output queue 18 for this data packet and the common output buffer 35 still hold enough space therefor, (i.e., no negative grant information GR has been generated). The independence of the input controllers 25 reduces significantly the complexity of the overall controlling resources. Each input controller 25 here has only to handle the arriving data packets according to a predetermined decision policy which might be a round robin policy, with or without fairness, priority-level precedence, or any other policy. Each of the input controllers 25 individually decides which of the packets it has stored will be sent to the input router 13 next.

A further improvement can be achieved by feeding back to the input controllers 25 a signal that gives the input controllers 25 more detailed information about the "filling degree" of the output queues 18. Since it is the objective to have, at any moment in time at any output port 30, a data packet to deliver to a next stage, the information that an output queue 18 is empty or almost empty can also be fed to the input controller 25 and be used to preferably send to the input router 13 those data packets which head for the respective output port 30. The status information of the output queues 18 can, for example, be derived by introducing one or several additional threshold values, (e.g., a threshold value at a filling degree 0 or close to 0). An empty or almost empty output queue 18 will hence be reported to the input controllers 25, which should then adopt their policy in a way, that this output queue 18 receives a data packet as soon as possible. Introducing several such threshold values allows a fine-grained status report to the input controllers 25 which can use this status report for each of the output queues 18 to influence their data packet multiplexing policy accordingly. This status report hence functions as sort of opposite of the grant information GR, hence as low-load alarm or load-maximizing scheduling feedback signal.

The mechanism to handle multicast data packets is here the same as with the arrangement according to FIGS. 1 and 3. Multiple priorities can be handled in that each input buffer 11 comprises one input queue 12 per output port 30 and per priority level (i.e., for 8 output ports 30 and 4 priorities, each input buffer 11 comprises a number of 32 input queues 12). The negative grant information GR can here be propagated more selectively to the input buffers 11, namely the negative grant information GR originating in one specific output queue 18 is only guided to the corresponding input queue 12 in the input buffers 11, respectively to the corresponding input queues 12 in the case of multiple priorities. Hence, all other input queues 12 are not blocked by this negative grant information and can continue sending their data packets to the common output buffer 35. In combination with the common output buffer principle applied here, an increased throughput, in comparison with the arrangement in FIGS. 1 and 3, can be achieved.

However, here an at first sight surprising effect occurs, namely, the performance decreases with increasing sharing intensity, opposite to what is expected. This can be explained as follows. The switching device 10 is here driven very near its maximum load capacity, (i.e., the output queues 18 are filled very near to their threshold value) since the selective grant information GR avoids head-of-the-line blocking. The effect of sharing is the buffering of overload of one output port 30, respectively its output queue 18, to the disadvantage of available capacity of the other output queues 18. Sharing works well, as long as its advantage is only used on a randomly distributed timescale. Because the virtual output buffer space is larger than the real buffer space, the risk exists that the output queues 18 are supplied with more addresses than the output buffer 35 has places. This is, of course, prevented by the output buffer grant mechanism. In combination with the arrangement, the virtual-output queuing has the effect that the input queues 12 are controlled very precisely according to the available capacity of the corresponding output queues 18. Hence the output queues 18 are driven very near to their maximum capacity. For this capacity being increased by introducing the sharing principle, the probability of negative grant information GR due to the output buffer 35 being full, rises. It also becomes clear, that, the higher the sharing factor (i.e. the number of times the virtual output buffer space contains the real buffer space) the higher is this probability and hence the detrimental effect on the overall performance with standard traffic.

The input buffer 11 with virtual output queuing can also be realized in form of a common input buffer 11 with or without sharing, applying the same principle as with the output buffer 35. This means that the arriving data packets can be stored in a common input buffer 11 while their addresses therein are stored in separate input queues 12, ordered according to the output ports 30 where these data packets are heading.

The arrangement of FIG. 4 can also be realized without virtual output queuing, hence providing a single queue input buffer 11 for each input port 20. In the proposed invention, scaling the arrangement, also referred to as switch fabric, from for example, 16×16, (i.e. 16 input ports 20×16 output ports 30), to 32×32, all switch adapters 19 need only change their queuing structure, but not their on-adapter input buffer 11. With proper foresight, this means that the actual number of linked-lists to manage this input buffer 11 as a collection of input queues 12 should be made programmable. Anyway, on the switch adapters 19 the complexity scales with the order of N (i.e., doubling the destinations means doubling the number of input queues 12 and output queues 18). With the classical VOQ-arrangement, doubling the number of switch input ports 20 and output ports 30 requires a square increase of requests (i.e., a 16×16 controller receives 256 requests, a 32×32 controller, 1024 requests).

Concerning multicast data packets, in the classical VOQ-arrangement, a multicast data packet requires special handling. The switching device 10 in this case does not contain any internal buffer. This means that in order to send a multicast data packet, all output ports 30 where this data packet goes to have to be free. This results in additional complexity in the switch controller 25: it has to recognize that a multicast data packet is to be transmitted, then it has to ensure that no other switch adapter 19 sends a data packet to one of the output ports 30 where the multicast data packet goes to, and then has to grant the sending allowance to the switch adapter 19 which will send the multicast packet and finally has to set multiple cross-points in the switching device 10. As long as this switch controller 25 comprises a simple logic, this is doable, but at the moment it becomes pipelined and runs with sophisticated algorithms which try to ensure best fairness and handling of priorities, this becomes a really complex task. A known current practice is to build separate multicast-queues where all adapters put their multicast data packets. This totally disrupts the relation between non-multicast and multicast traffic, which is hence considered a suboptimal solution. It is namely not possible to send two multicast data packets, one from a first switch adapter 19 and one from a different switch adapter 19, when there is at least one output port 30 which overlaps in the destinations of these two multicast data packets. This severely disrupts the throughput performance.

In the case of the arrangement according to FIG. 3, if a switch adapter 19 has a multicast data packet to send, and the output queues 18 which will receive a copy of this data packet do not signal that their threshold is exceeded, the data packet can be sent. Multiple switch adapters can send multiple multicast data packets simultaneously, without ever having to know from each other where they actually send to. A potential collision is solved by the output buffer 35. The switching device 10 with virtual-output queuing and shared output buffer (i.e., the common output buffer 35) offers a good mechanism for handling multicast data packets, because, unlike in other switching devices 10, the data packet needs not be replicated several times, which hence saves buffer space, and the multicast data packet can nevertheless be handled in the same way as are unicast packets. This facilitates traffic control and policing. A better real-time behavior is thereby achieved, in that multicast data packets do not suffer an artificial additional latency for use of an extra-handling process.

Using input queues 12 for each priority, avoids blocking of high-prior data packets by low-prior data packets which again adds to the quality of service of the switching device 10. The performance of the switching device 10 according to the invention can be increased in various ways. For the increase of number of input ports 20 and output ports 30, the switching device 10 can be arranged in a multistage- or in a singlestage arrangement. In the multistage arrangement, the number of needed switching devices 10 grows slower than in a comparable singlestage arrangement, (i.e., with growing number of ports a multistage arrangement needs fewer switching devices 10 than a singlestage arrangement).

However, the performance of a multistage arrangement is lower because of increased latency and because of the possibility of negative grant information GR due to total use of an output queue 18 by one connection which prevents processing of data packets with other destinations or a total use of the output buffer 35 which blocks all switching device inputs and propagates towards the preceding stage. This lower performance can to a certain extent be compensated by a speedup factor. This means that the switching device 10 is running at a higher speed than its environment. Then, an output buffer 35 is needed behind the switching device 10 to queue the faster incoming data packets which are sent out from the last stage and are to be passed over to the following hardware environment at a lower speed. Another possibility is to increase switch-internal memory, such that total use of the output buffer 35 is less likely. Using more memory is, however, extremely expensive and to some extent also physically limited. Increasing switching device memory by the memory expansion mode avoids the physical limit but is nevertheless expensive. If in a multistage arrangement a subsequent switching device 10 is crowded (i.e., its output buffer 35 is full such that no address is available, or the output queue 18 is full) a negative grant information GR can be generated for all inputs, which grant information GR is again transferred to all preceding switching devices 10. In the case of full output queues 18, the grant information GR can be selectively blocking only to data packets heading for the fill output queue 18. In the case of a fill output buffer 35, all input buffers 11 are to be blocked. The negative grant information GR blocks the preceding switching device 10 in that this switching device 10 can no longer send cells.

The herein presented switching device 10 is scaleable with any of the known expansion methods, e.g. known from the PRIZMA architecture mentioned in the chapter introducing background art. Hence speed expansion, port expansion, performance expansion, memory expansion, which here would be availability of bigger output buffer space, link-paralleling and also master-slave principle, and finally any combination thereof, are applicable. The described embodiments are combinable in part as well as in whole.

Having thus described the invention, what is claimed is:

1. A switching device comprising:
    a plurality of input ports each being connectable to a corresponding switch adapter;
    a plurality of output ports;
    at least one switch controller for controlling the routing of incoming data packets from said input ports to said output ports;

a congestion controller associated with each of said output ports, each of said congestion controllers being adapted to generate grant information to indicate whether said switch adapters can send a data packet to the associated output port; and a data packet access controller associated with each of said input ports, each of said data packet access controllers being adapted to mark as non-compliant any packet which is erroneously sent by said switch adapters, wherein the data packet access controller additionally comprises a timer wherein data packets which arrive at said input port before a predetermined time interval has passed after the time the grant information signaling non-allowance has been generated are marked as non-compliant.

2. The switching device according to claim 1, wherein each output port comprises an buffer and means for determining a filling degree for said output buffer and wherein the congestion controller is assigned to an output buffer at the output port based on one of the overflow of the buffer filling degree over a first threshold and underflow of the buffer filling degree under a second threshold.

3. The switching device according to claim 1, wherein the grant information comprises one or more bits per output port.

4. The switching device according to claim 1, wherein the grant information of all output ports of the switching device is communicable to each switch adapter.

5. A switching device comprising:
a plurality of input ports each being connectable to a corresponding switch adapter;
a plurality of output ports;
at least one switch controller for controlling the routing of incoming data rackets from said input ports to said output ports;
a congestion controller associated with each of said output ports, each of said congestion controllers being adapted to generate grant information to indicate whether said switch adapters can send a data packet to the associated output port; and
a data packet access controller associated with each of said input ports, each of said data packet access controllers being adapted to mark as noncompliant any packet which is erroneously sent by said switch adapters,
wherein the output buffer is a common output buffer with addresses for the data packets, and said switching device comprises an input router and an output router, and an address-manager for managing the use of said addresses of said common output buffer, an output-queue-manager for entering order information, about at which addresses said data packets are stored in said common output buffer, into output queues which are connected to said output router.

6. The switching device according to claim 5, wherein the output queues provide in total more queuing places for the order information than the common output buffer has addresses.

7. A method of controlling the routing of data packets through a switching device having a plurality of input ports and a plurality of output ports, each of said input ports being connectable to a corresponding switch adapter, and having at least one switch controller for controlling the routing of incoming data packets from said input ports to said output ports, comprising the steps of:
generating, by a congestion controller associated with each of said output ports, grant information which signals whether said switch adapters are allowed to send a data packet to the associated output port; and
marking as noncompliant any data packet which is erroneously sent by said switch adapters,
wherein data packets are marked as non-compliant only after a predetermined time interval has passed from the time the grant information signaling non-allowance has been generated.

8. The method according to claim 7, wherein the grant information is determined by the relation of the buffer filling degree of an output buffer at the output port to one of a first threshold and a second threshold.

9. The method according to claim 7, wherein the grant information is generated in form of a grant bit per output port.

10. The method according to claim 7, wherein the grant information for all output ports of the switching device is communicated to each switch adapter.

11. The method according to claim 10 wherein the grant information for all output ports of the switching device is provided in form of a bit map.

* * * * *